United States Patent [19]

Maehara

[11] 4,194,792
[45] Mar. 25, 1980

[54] DECELERATION SENSING TYPE PROPORTIONING VALVE

[75] Inventor: Toshifumi Maehara, Chichibu, Japan

[73] Assignee: Akebono Brake Industry Co. Ltd., Tokyo, Japan

[21] Appl. No.: 954,748

[22] Filed: Oct. 26, 1978

[30] Foreign Application Priority Data

Nov. 10, 1977 [JP] Japan .............................. 52/135044
Jan. 23, 1978 [JP] Japan .............................. 53/5991

[51] Int. Cl.² .............................................. B60T 8/14
[52] U.S. Cl. ................................... 303/24 F; 303/6 C
[58] Field of Search ............. 188/349; 303/6 C, 24 A, 303/24 C, 24 F

[56] References Cited

U.S. PATENT DOCUMENTS

3,727,990   4/1973   Vogt ................................... 303/24 A
3,795,424   3/1974   Lewis ................................. 303/24 F

*Primary Examiner*—Duane A. Reger
*Attorney, Agent, or Firm*—Toren, McGeady and Stanger

[57] ABSTRACT

A deceleration sensing type proportioning valve for oppositely distributing front and rear wheel braking forces in a vehicle. A valve seat is arranged to follow the movement of an adjustment piston in such a way as to increase the degree of compression of a control spring before a plunger comes into contact with the valve seat. The piston and the plunger move in the same direction to permit arrangement of a valve body portion of the plunger to be carried by the adjustment piston in an embracing manner for reduction in size of the whole proportioning valve assembly.

10 Claims, 4 Drawing Figures

DECELERATION SENSING TYPE PROPORTIONING VALVE

BACKGROUND OF THE INVENTION

1. Field of the Invention

This invention relates to a deceleration sensing type proportioning valve which is capable of appositely distributing front and rear wheel braking forces at the time of braking a vehicle.

2. Description of the Prior Art

It is known that, generally in order to obtain an effective wheel braking force by having a suitable slip ratio between wheels and a road surface, braking forces on rear wheels must be arranged to be lower than the front wheels. This is because the front wheels are pressed against the road surface by a greater force than the rear wheels and, because of variation in the directionality of the force of inertia, the ideal braking force distribution ratio of the front wheels to rear wheels becomes as represented by the characteristic curves a, b and c shown in FIG. 1 of the accompanying drawings. Increase of loadage W mainly results in increase in the force of pushing the rear wheels against the road surface. Therefore, the above stated characteristic curve varies with the increase of loadage in such a way as a→b→c as shown in FIG. 1 and thus gradually approaches a front wheel-to-rear wheel braking force ratio $Fr/Ff = 1/1$.

It is desirous to bring an actual front wheel-to-rear wheel braking force ratio closer to the ideal braking force distribution ratio. In view of this, therefore, a control valve such as a proportioning valve or the like has heretofore been inserted in a hydraulic line connecting a hydraulic source (a master cylinder) to a rear wheel braking device.

In the conventional valve of this type, hydraulic oil pressure to be transferred is arranged to begin to gradually increase when it reaches a predetermined value which is set as a turning point. However, since this turning point is fixed, in the case of a vehicle such as a truck that has a great variation in live load, the actual control characteristic curve has been deviating to a great degree from the ideal curve.

This problem may be solved by adding a load responsive mechanism which detects relative displacement of a vehicle body and an axle resulting from a change in the load and which changes the above stated turning point of the hydraulic pressure in response to the relative displacement. However, such arrangement results in a disadvantage such as a complex structure, increase of parts, a rise of cost, etc.

Further, in connection with the solution of the above stated problem, U.S. Pat. No. 3,825,303 discloses a deceleration sensing type proportioning valve. In this proportioning valve, there is provided a plunger which confronts an adjustment piston within a cylinder; a control spring which determines a turning point hydraulic pressure value is provided between the plunger and the adjustment piston; and the turning point hydraulic pressure is arranged to be increased by compressing the control spring approximately in proportion to the increase of the value of hydraulic pressure shut in within a hydraulic adjustment oil chamber.

SUMMARY OF THE INVENTION

It is an object of the present invention to provide a deceleration sensing type proportioning valve in which a valve seat is arranged to follow the movement of an adjustment piston in such a way as to increase the compressing degree of a control spring before a plunger comes into contact with the valve seat.

In accordance with this arrangement of the present invention, the piston and the plunger move in the same direction. This permits to have a valve body portion of the plunger arranged to be carried by the adjustment piston in an embracing manner, so that the whole valve assembly can be manufactured in a more compact size.

The above and further objects and novel features of the invention will be apparent from the following description of preferred embodiments thereof taken in connection with the accompanying drawings.

DETAILED DESCRIPTION OF PREFERRED EMBODIMENTS

Figure 2:
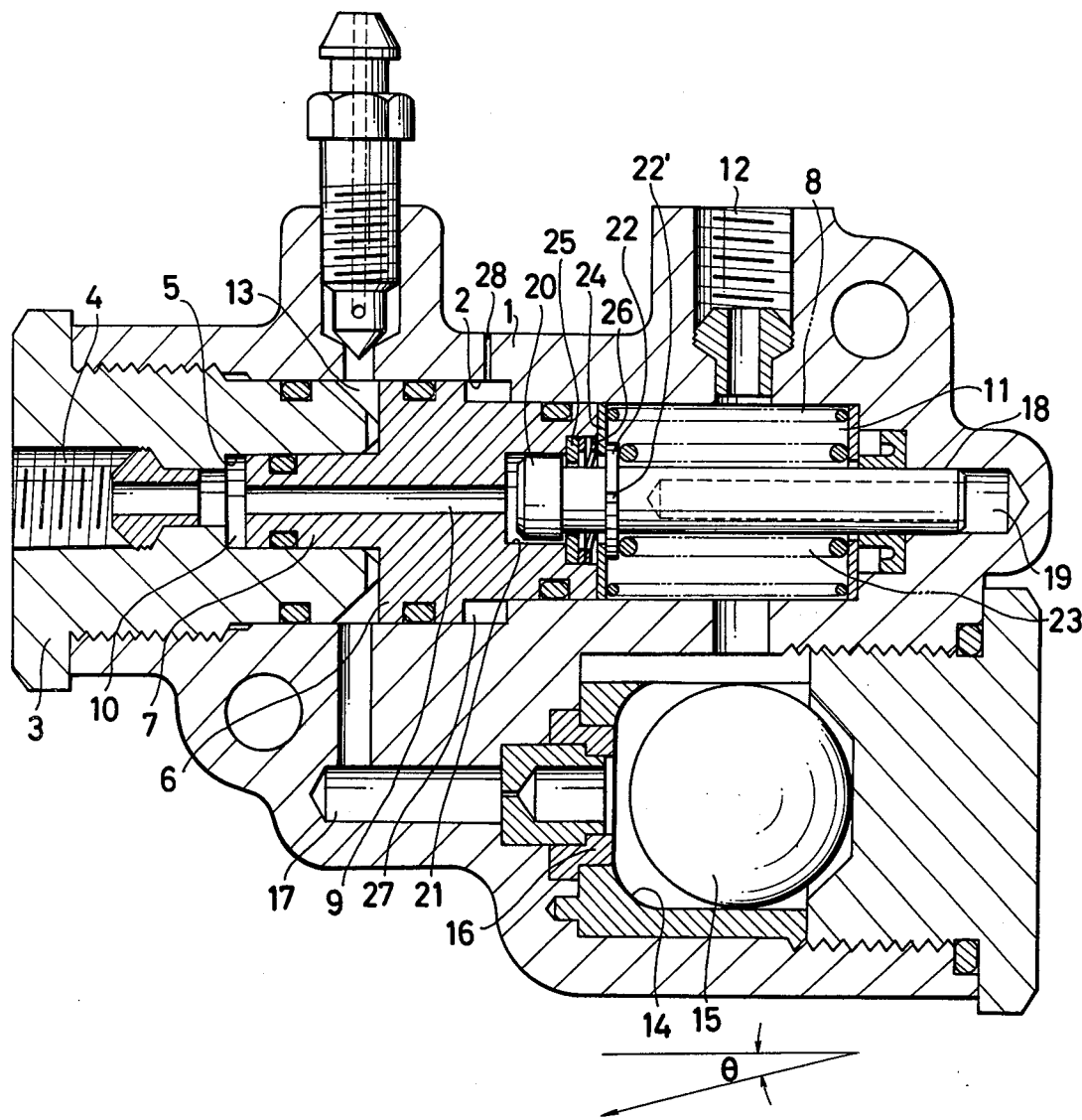
FIG. 2 is a longitudinal sectional view showing one embodiment of a proportioning valve according to the present invention.

Referring to FIG. 2, a reference numeral 1 indicates a valve body; 2 indicates a stepped cylinder; and 3 indicates a plug which closes a large diameter part of the stepped cylinder 2. The plug 3 is provided with an outlet port 4 communicating with a rear wheel brake device which is not shown in the drawing and a small diameter cylinder 5 which is formed therein. An adjustment piston 6 is arranged to slidably engage the stepped cylinder 2. The adjustment piston 6 is provided with a small diameter extended part 7 which extends from a large diameter end of the adjustment piston 6 to slidably engage the small diameter cylinder 5. Normally, the adjustment piston 6 is urged and biased to engage with the plug 3 by a spring force $F_2$ of an adjustment spring 8 exerted on the small diameter end thereof.

A fluid passage 9 is provided to penetrate through the axial portion of the stepped adjustment piston 6. The above stated port 4 and the fluid passage 9 communicate with an output hydraulic oil or fluid chamber 10 which faces the end face of the small diameter extended part 7 of the adjustment piston 6. An input hydraulic oil or fluid chamber 11 is disposed in a position to have the small diameter part of the stepped cylinder 2 and the small diameter end face of the adjustment piston 6 facing thereon respectively. The input hydraulic oil chamber 11 communicates with a master cylinder, which is not shown, through an input port 12 and also communicates with the output hydraulic oil chamber 10 through the fluid passage 9.

The large diameter end face of the adjustment piston faces on an adjustment hydraulic oil or fluid chamber 13, which communicates with the above stated input hydraulic oil chamber 11 through a deceleration sensing valve mechanism. The deceleration sensing valve mechanism is arranged to be guided by a guide face 14 arranged at an angle of elevation $\theta$ to the running direction of the vehicle (the direction of arrow shown in the drawing) and to have a ball 15 moved by the force of inertia resulting from a given deceleration gc when the brake is applied to the vehicle. Then the ball 15 comes into contact with the valve seat 16 to shut off the communication of the fluid passage 17.

One end of a plunger 18 disposed inside the input hydraulic oil chamber 11 is slidably inserted into a blind hole 19 provided in the valve body 1 while the other end of the plunger 18 which is provided with a large diameter part 20 forming a valve body part is inserted in a recessed part 21 formed in the small diameter end of the adjustment piston 6.

A flange portion 22 of the plunger 18 is arranged to have the plunger 18 biased by a spring force $F_1$ of a control spring 23 to engage with the adjustment piston 6 through a retainer plate 24. In the flange portion 22, there are provided a plurality of slits 22'. A valve seat 25 is secured by a spring 26 to the inside of the recessed part 21 provided in the small diameter end of the adjustment piston 6. The valve seat 25 is arranged to have normally a predetermined space between it and the head portion 20 of the plunger 18 to keep the fluid communication passage between the input and output hydraulic oil chambers open. The fluid passage is closed when the plunger 18 moves to bring its head portion 20 into contact with the valve seat 25. There is provided a chamber 27 which communicates with the atmosphere through a passage 28. The embodiment of the present invention as described in the foregoing operates in the following manner:

Under a non-braking condition, the plunger 18 and the adjustment piston 6 are biased to the left, as viewed on the drawing, by an urging spring force. Then, the input hydraulic oil chamber 11 and the output hydraulic oil chamber 10 are communicating with each other through the fluid passage 9. The deceleration sensing valve mechanism also has the fluid passage 17 open to allow the input hydraulic chamber 11 and the adjustment hydraulic oil chamber 13 to communicate with each other.

In the initial stage of a braking operation, when hydraulic pressure is transmitted to the input hydraulic oil chamber, input hydraulic pressure Pi is transmitted to the output hydraulic oil chamber 10. Concurrently with this, the input hydraulic pressure Pi is transmitted also to the adjustment hydraulic oil chamber 13 through the fluid passage 17 of the deceleration sensing valve mechanism.

At that moment, the input hydraulic pressure Pi, output hydraulic pressure Po and the hydraulic pressure in the adjustment hydraulic oil chamber Pa are in the relationship of Pi=Po=Pa. Then, hydraulic pressure is exerted on the plunger 18 and on the adjustment piston 6 in the left and right directions as viewed on the drawing in the following manner:

Plunger 18:

$$PoA_1 \text{ (rightward direction)} \tag{1}$$

$$Pi(A_1 - A_2) \text{ (leftward direction)} \tag{2}$$

wherein $A_1$ represents the sectional area of the head portion 20 of the plunger 18 and $A_2$ the sectional area of the shaft portion of the plunger 18.

Adjustment Piston 6:

$$PoA_3 + PaA_4 \text{ (rightward direction)} \tag{3}$$

$$PiA_5 \text{ (leftward direction)} \tag{4}$$

wherein $A_3$ represents the sectional area of the small diameter extended part 7 of the adjustment piston 6; $A_4$ = (the sectional area of the large diameter portion of the adjustment piston) $-A_3$; and $A_5$ the sectional area of the small diameter end on the right side of the adjustment piston 6.

Since $A_1 > A_1 - A_2$ and $A_3 + A_4 > A_5$, there obtains the relations of Formula(1) > Formula(2) and Formula(3) > Formula(4) and forces to move the plunger 18 and the adjustment piston 6 to the right come to increase as the hydraulic pressure increases.

When the rightward moving forces exceed respectively the counteracting spring forces $F_1$ and $F_2$ of the control spring 23 and adjustment spring 8, the adjustment piston 6 and the plunger 18 are simultaneously moved to the right as viewed on the drawing.

Assuming that the adjustment piston 6 is stationary, the plunger 18 begins to move to the right, as viewed on the drawing, when $$PoA_1 > Pi(A_1 - A_2) + F_1 \tag{5}$$

Following this, when there obtains the following relation the head portion 20 of the plunger 18 comes into contact with the valve seat 25:

$$PoA_1 = Pi(A_1 - A_2) + F_1 + k_1x_0 \tag{6}$$

wherein $k_1$: the spring constant of the control spring, and $x_0$: space between the valve seat and the head portion of the plunger 18.

After that, the output hydraulic pressure Po increases maintaining the following relation to the input hydraulic pressure Pi:

$$Po = \frac{A_1 - A_2}{A_1} Pi - \frac{F_1 + k_1x_0}{A_1} \tag{7}$$

Then, from Formula (6), a turning point hydraulic pressure Pc is obtained as follows:

$$Pi = Po = (F_1 + k_1x_0)/A_2 = Pc \tag{8}$$

After the turning point Pc, there takes place a slow increase of the output hydraulic pressure Po in the following manner:

$$\tan\theta = \frac{A_1 - A_2}{A_1} < 1$$

As for the adjustment piston 6, in the case of the present embodiment, the adjustment piston 6 is under the condition of (Po=Pa=Pi).

$$PoA_2 + PoA_3 + PaA_4 > PiA_5 + F_1 + F_2 \tag{9}$$

and the piston 6 begins to move to the right, as viewed on the drawing, being followed by the plunger 18, because it is also urged by the spring force of the control spring 23. When the deceleration of the vehicle reaches a predetermined value gc due to a braking operation, the ball 15 of the deceleration sensing valve mechanism comes into contact with the valve seat 16 to close the fluid passage 17. Then, the adjustment hydraulic pressure Pa is shut in thereby and thereafter does not increase even if the input hydraulic pressure increases. The position of the adjustment piston 6 at this moment is determined by the value of x' which satisfies a balancing condition expressed by the following formula and the piston 6 comes to a stop:

$$PoA_2 + PoA_3 + PaA_4 = PiA_5 + F_1 + k_1 x' + F_2 + k_2 x' \qquad (10)$$

wherein $k_2$: spring constant of the plunger 18
x': extent to which the adjustment piston moves Accordingly, the output hydraulic pressure Po slowly increases as the head portion 20 of the plunger 18 repeatedly comes into contact with and moves away from the valve seat 25 which remains stationary in its position. The spring force of the control spring 23 which determines the above stated turning point hydraulic pressure Pc shown in Formula (8) becomes $F_1 + k_1 x_0 \rightarrow (x_0 + x')$. It will be understood that the value of the turning point hydraulic pressure Pc then increases approximately in proportion to the extent x' to which the adjustment piston 6 moves.

The moving extent x' of the adjustment piston 6 is proportional to the value Pa of the hydraulic pressure shut in the adjustment hydraulic oil chamber 13. Since the hydraulic pressure value Pa at the time of shutting off the fluid passage 17 of the deceleration sensing valve mechanism is approximately in proportion to the increase of load on the vehicle, the value of the turning point hydraulic pressure Pc comes to vary approximately in proportion to the variation of a live load on the vehicle. Further, since control of the turning point hydraulic pressure value Pc by the adjustment piston 6 is required to be performed only within a range from zero live load of the vehicle (no live load on the vehicle) to the maximum live load (rated live load condition), the moving amount or extent x' of the adjustment piston 6 can be zero when there is no live load on the vehicle and then it is desirable to set the spring forces of the adjustment spring 8 and the control spring 23 accordingly.

In the case of the conventional arrangement mentioned in the foregoing, when a braking pressure suddenly increases in response to a quick braking operation, an adjustment hydraulic pressure value Pa which is higher than a setting value might be shut in the adjustment hydraulic oil chamber. Then, this tends to result in an erroneous adjusting action on the turning point hydraulic pressure value. On the other hand, in the present invention, when abnormally high pressure is introduced in the adjustment hydraulic oil chamber 13, abnormally high pressure also acts through the input hydraulic oil chamber 11 to prevent the adjustment piston from being moved by the abnormally high pressure, so that erroneous adjustment of the turning point hydraulic pressure value can be prevented thereby.

Further, in the above stated embodiment example, the plunger 18 is arranged to follow the movement of the adjustment piston 6. However, it is also possible to have the movement of the adjustment piston 6 cause only the valve seat 24 to move to increase the space $x_0$ between the valve seat 24 and the head portion of the plunger 18. In such a case, it will be readily understood, the same control action can be obtained by just changing the spring forces $F_1$ and $F_2$ of the control spring 23 and the adjustment spring 8 and the values of the spring constants $k_1$ and $k_2$.

Figure 3:
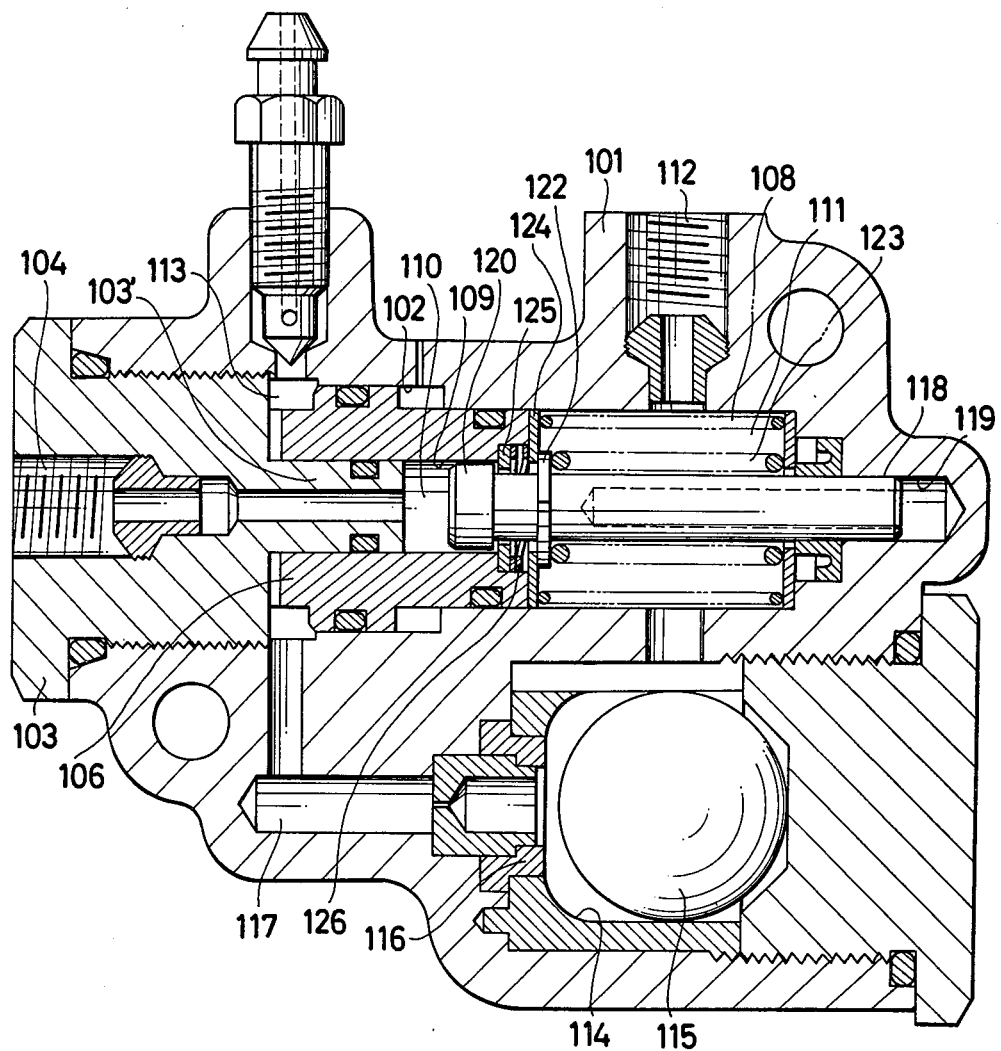
FIG. 3 is a longitudinal sectional view of another embodiment of a proportioning valve according to the present invention.

FIG. 3 shows another embodiment of the present invention. In FIG. 3, the parts corresponding to the parts shown in the foregoing embodiment are indicated by like reference numerals except that 100 is added to each of these numerals. This embodiment is identical with the foregoing embodiment with the exception of that the fitting relation between an adjustment piston 106 and a plug 103 differs from the relation shown in the foregoing embodiment. A fluid passage 109 of relatively large diameter is formed in the axial portion of the adjustment piston 106. An extension 103' formed on the plug 103 is fitted into the fluid passage 109. An output hydraulic oil chamber 110 is disposed within the fluid passage 109 of the adjustment piston 106. An adjustment hydraulic oil chamber 113 is disposed in a position confronting the large diameter end part of the adjustment piston 106. Therefore, the movement of the adjustment piston 106 is arranged to be balanced with the pressure Pa inside the adjustment hydraulic oil chamber, the pressure Pi inside an input hydraulic oil chamber and the spring forces $F_1$ and $F_2$ of the adjustment spring 108 and the control spring 123 irrespective of the hydraulic pressure Po of the output hydraulic oil chamber 110. However, the operation and the control characteristic of this embodiment is virtually the same as the foregoing embodiment.

Figure 1:
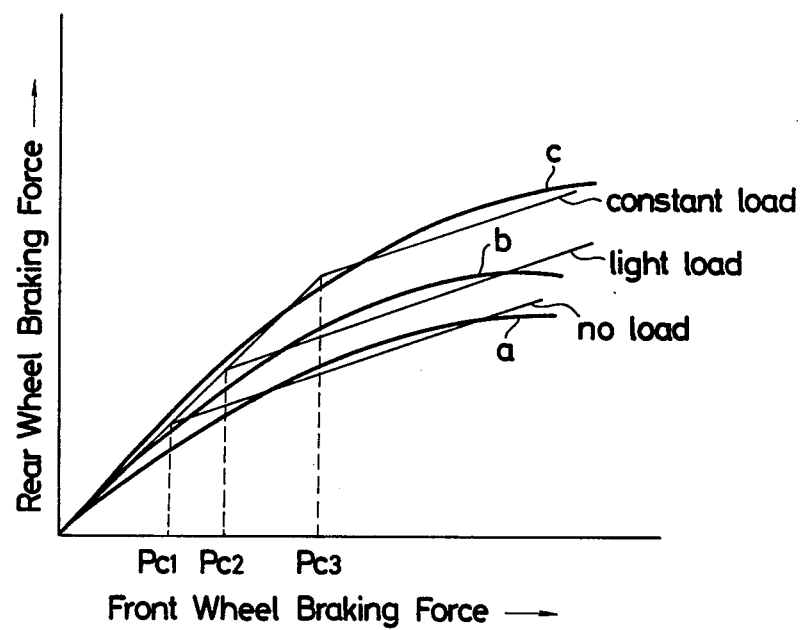
FIG. 1 is a graph which illustrates characteristics of the deceleration sensing type proportioning valve of the present invention in comparison with ideal braking force distribution curves.
Figure 4:
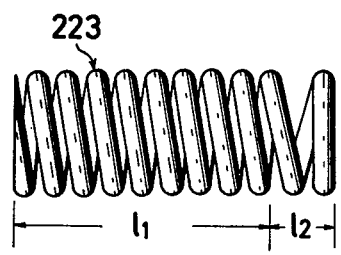
FIG. 4 illustrates a modification of a control spring which can be used in the embodiment of FIGS. 2 and 3.

FIG. 4 shows a spring as a modification example of the control spring 23 or 123 which is employed in each of the two embodiments described in the foregoing. In FIG. 4, the spring 223 comprises a part $l_1$ which has a smaller spring constant and another part $l_2$ which has a larger spring constant. Accordingly, the spring has the smaller spring constant when the amount of flexible deformation of the spring 223 is below a certain given value and has the larger spring constant when the amount of flexible deformation exceeds the given value. With this spring employed as control spring, its load is applied to the plunger 18 or 118. In the initial stage of braking, a smaller load is placed on the plunger 18 or 118 by utilizing the smaller spring constant to obtain a low turning point hydraulic pressure value Pc when there is no live load on the vehicle. In this instance, even if there were some variation in the mounting length of the spring 223, variation in the turning point hydraulic value Pc would be small because of the small spring constant. Then, when the adjustment piston 6 or 106 is caused to move by the hydraulic pressure Pa with the vehicle loaded with a live load, a large load is applied to the plunger by utilizing the larger spring constant of the spring 223, so that a higher turning point hydraulic pressure value can be obtained. Since the larger spring constant of the spring 223 is used when a live load is on the vehicle, the increase in the turning point hydraulic pressure value Pc within the range from no live load condition to max. live load condition can be effected to a greater extent for an ideal braking force distribution throughout the whole range from no live load condition up to the max. live load condition.

In this modification example, the spring 223 is arranged to have its spring constant vary in a stepwise manner. However, the spring constant may be arranged to vary in a non-stepwise manner.

As compared with the conventional deceleration sensing type proportioning valve, wherein an adjustment piston is arranged to be caused by a hydraulic power to move relative to a plunger in such a manner as to shorten its span and wherein a control spring which urges the plunger with its spring force is compressed by this relative movement, the deceleration sensing type proportioning valve of the present invention is characterized in that the adjustment piston is arranged to move in parallel with and in the same direction as the plunger in such a manner as to change the position of the valve seat which cooperates with the plunger. This arrangement makes it possible to shorten the length of the proportioning valve in the direction of the cylinder for reduction in the size of the whole valve assembly.

What is claimed is:

1. A deceleration sensing type proportioning valve adapted to be disposed between a fluid pressure source and a brake device on a vehicle for controlling fluid pressure communicated to said brake device from said pressure source when said vehicle decelerates above a given rate and the fluid pressure of said source exceeds a desired value, said proportioning valve comprising:

a valve body including therein an input chamber for receiving fluid from an outside pressure source, an output chamber for communicating said fluid with an outside device, an adjustment chamber, and a first fluid passageway extending between said input and adjustment chambers, said body having first and second diameter cylinders formed therein, said first diameter cylinder being in fluid communication with said adjustment chamber and said second diameter cylinder being in fluid communication with said input chamber;

a stepped adjustment piston having a second fluid passageway extending axially therethrough, and large and small diameter ends for slidably engaging said first and second diameter cylinders in sealing relationship therewith, respectively, so that the large diameter end of said piston is subjected to fluid pressure developed in said adjustment chamber and the small diameter end of said piston is subjected to fluid pressure developed in said input chamber wherein said piston is subjected to the difference between said adjustment and said input chamber pressures;

a valve seat formed in said second fluid passageway in said piston;

a plunger mounted for axial sliding movement within said valve body, one portion of said plunger confronting said piston to engage and disengage with said valve seat in response to fluid pressure communicated thereto from said output chamber through said second passageway, and another portion of said plunger being in fluid communication with said input chamber wherein said plunger is subjected to the difference between said output and said input chamber pressures to urge said plunger to engage said valve seat to prevent fluid communication between said input and output chambers through said second passageway;

a first spring mechanism mounted in said body for exerting a first force on said adjustment piston in a direction to counter movement of said piston in response to the pressure on said piston;

a second spring mechanism mounted in said body for exerting a second force on said plunger in a direction to counter movement of said plunger in response to the pressure on said plunger, thereby urging said plunger to disengage said valve seat;

deceleration sensitive valve means provided in said first fluid passageway for preventing fluid communication between said input and adjustment chambers when deceleration of said vehicle attains a predetermined value;

means for connecting said adjustment piston and said plunger so that said plunger moves together with said piston in a direction opposite to forces provided on said piston and said plunger by said first and second spring mechanisms when the pressure on said piston attains a given value;

said piston being moved in response to the pressure thereon by an amount corresponding to a desired turning point pressure, wherein said plunger engages and disengages said valve seat to control fluid pressure communicated to said output chamber when the input chamber fluid pressure exceeds said turning point pressure.

2. A deceleration sensing type proportioning valve according to claim 1, wherein the spring constant of said second spring mechanism in the initial stage is smaller than the spring constant which said spring mechanism comes to have when the amount of flexible deformation thereof exceeds a predetermined value.

3. A deceleration sensing type proportioning valve according to claim 1, wherein the spring constant of said second spring mechanism is arranged to increase in proportion to the amount of flexible deformation of the second spring mechanism.

4. A deceleration sensing type proportioning valve according to claim 1, wherein there is provided a fluid passage in the axial portion of the adjustment piston for connecting said input and output chambers to each other.

5. A deceleration sensing type proportioning valve according to claim 4, wherein said adjustment piston receives the fluid pressure of said output chamber; and the sum of pressure receiving areas at one end of the adjustment piston confronting said adjustment chamber and said output chamber is larger than the pressure receiving area at the other end of the adjustment piston confronting said input chamber.

6. A deceleration sensing type proportioning valve according to claim 4, wherein the pressure receiving area of said adjustment piston at one end thereof confronting said adjustment chamber is larger than the pressure receiving area of said adjustment piston at the other end thereof confronting said input chamber.

7. A deceleration sensing type proportioning valve according to claim 4, wherein a pushing force of said second spring mechanism is exerted on said adjustment piston through said plunger.

8. A deceleration sensing type proportioning valve according to claim 5, wherein a head portion of said plunger which engages said valve seat is placed within a recess which communicates with the fluid passage provided in the axial portion of said adjustment piston.

9. A deceleration sensing type proportioning valve according to claim 6, wherein the head portion of said plunger which engages said valve seat is placed within the fluid passage provided in the axial portion of said adjustment piston.

10. A proportioning valve according to claim 1, wherein said first fluid passageway has a guide face arranged at a given vertical angle relative to the running direction of said vehicle and a valve seat formed therein, and said deceleration sensitive valve means includes a ball arranged to be guided for movement over said guide face to engage the valve seat in said first fluid passageway when the deceleration of said vehicle attains said predetermined value.

* * * * *